United States Patent [19]

Thelberg

[11] 4,172,538

[45] Oct. 30, 1979

[54] TRANSPORT AND STORAGE CONTAINER FOR FLUENT OR FLUIDIZABLE MATERIAL

[75] Inventor: Karl-Göran Thelberg, Arboga, Sweden

[73] Assignee: AB Broderna Rickardsson, Arboga, Sweden

[21] Appl. No.: 821,504

[22] Filed: Aug. 3, 1977

[30] Foreign Application Priority Data

Sep. 2, 1976 [SE] Sweden .............................. 7609727

[51] Int. Cl.² .............................................. B65D 83/06
[52] U.S. Cl. .................................... 222/630; 222/389
[58] Field of Search ............... 222/193, 389, 263, 626, 222/195, 330; 214/17 D, 17 DA, 82

[56] References Cited

U.S. PATENT DOCUMENTS

| 3,156,100 | 11/1964 | Haettinger et al. | 222/389 X |
| 3,421,663 | 1/1969 | Paton | 222/330 X |
| 3,847,307 | 11/1974 | Hosek | 222/386.5 |

*Primary Examiner*—Stanley H. Tollberg

[57] ABSTRACT

Transport container for fluidizable material, such as pulverized or granular material, having a gable movable like a piston in the longitudinal direction of the cylinder, the gable being furnished with a fluidizing device in its lower part movable along the bottom side of the cylinder.

11 Claims, 5 Drawing Figures

U.S. Patent   Oct. 30, 1979   Sheet 1 of 2   4,172,538

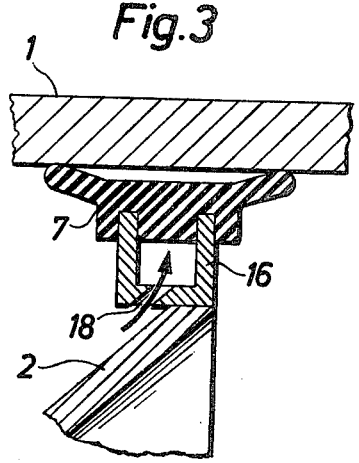
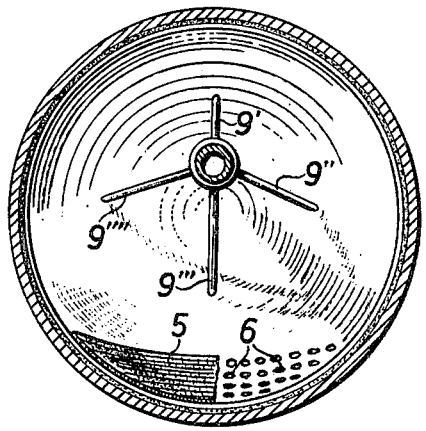
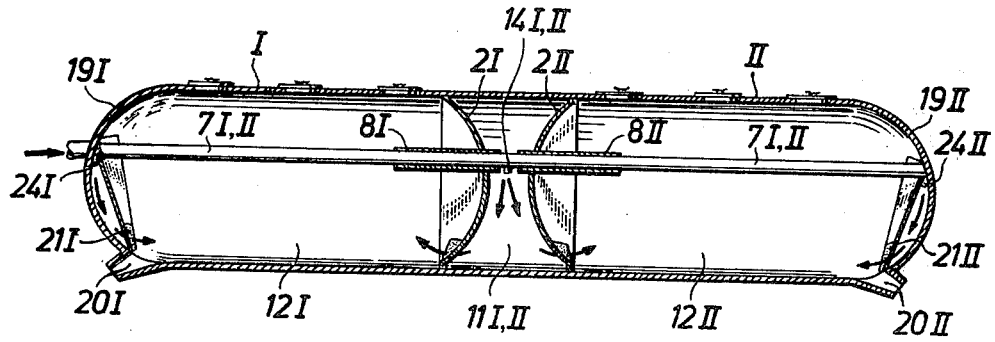

TRANSPORT AND STORAGE CONTAINER FOR FLUENT OR FLUIDIZABLE MATERIAL

Transport or storage containers for fluent or fluidizable material are known, especially for pulverized material, e.g., cement, sand, lime, chalk, flour, sugar, fodder, plastic and other finely divided material, as also particulate or granulated material. One generally used for this purpose long hollow bodies which are formed by welding together vertically aligned cylindrical or spherical elements side by side, the attempt being made to approach the outer contour of a cylinder.

The various cylindrical or spherical elements are for this purpose furnished at the top with individual manholes for loading and at the bottom with individual emptying and fluidizing arrangements for tapping of the material from the containers.

These welded-together containers are made of steel, aluminium or stainless steel constructed in self-supporting form.

Figure 1:
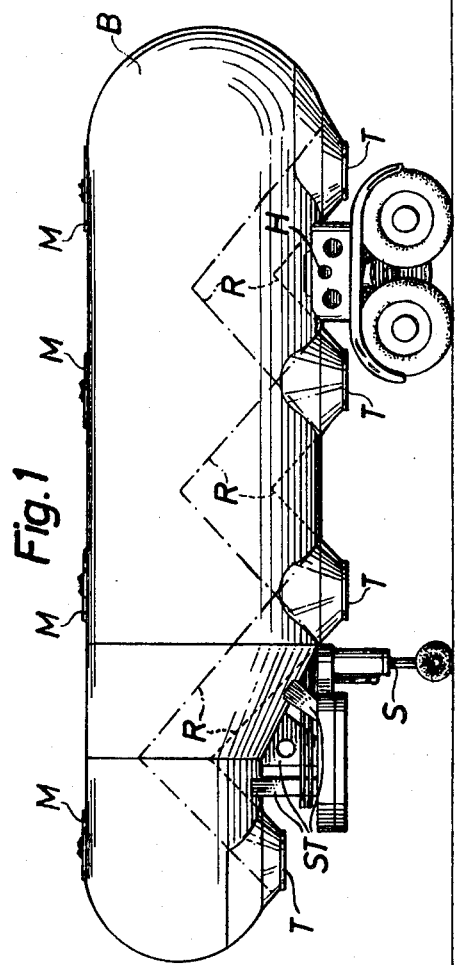

An example of a known transport container of this kind is shown in FIG. 1 in the attached drawings, the container being denoted by B, the various manholes by M and the tapping devices by T. The rear end of the container is supported by a bogie H and the fore end by a support wheel S. The container is designed to be directly coupled to a towing vehicle by means of a turntable V. The turntable V is attached to the container body B by means of struts ST. Inside the container body are guiding or feeding plates R, indicated by broken and dash-dot lines.

Such containers have certain disadvantages.

From the traffic aspect it is inopportune that the containers are bulky and have a high point of gravity.

Furthermore, as appears from FIG. 1, they contain much dead, unused space.

For discharging purposes it is a disadvantage that they have many outlets; a large vehicle may have up to six outlets.

The containers are also expensive to manufacture, firstly because of the large number of elements to be welded together, secondly because of the large number of outlets, and thirdly because of the difficulty of attaching the guiding or feeding plates so that they have a good fit to the inner walls of the container.

For certain purposes use is made of a single cylindrical container which is discharged through a discharge device with outlet at one end gable of the cylinder by tilting the cylinder towards the outlet, which is provided with a fluidizing device.

This construction has the advantage of avoiding all dead space in the container and of having only one discharging device. In this case, however, it is not sufficient to have a self-supporting cylinder, but the vehicle must also be equipped with a robust load-carrying chassis in the form of a continuous frame. Another disadvantage is that, when the container is long, e.g., up to 11 m or more, there is trouble with the surface exposed to the wind, especially during tilting. It has happened that the entire truck has been overturned by the force of the wind.

It is thus desirable to maintain the satisfactory manufacturing characteristics, and to some extent also mechanical strength, of the tilting container, but to avoid the use of a special frame or chassis, and also to avoid the disadvantage of the large surface exposed to the wind.

The intention of the present invention is to solve this problem and to avoid the disadvantages of hitherto known constructions, and furthermore, for such transport vehicles or for stationary use, to provide a cylindrical container which need not be tilted but can be furnished with only one discharge device at one end gable.

The invention consists essentially in the fact that, for discharge, the container has a gable or the like movable like a piston in the longitudinal direction of the cylinder the said piston gable at least in its lower portion, i.e., that moving along the bottom side of the cylinder, being furnished with a fluidizing device. The container should preferably be furnished with a longitudinal guide tube for guiding the piston gable, which can be done by means of a sliding tube passing over said guide tube, which can be connected to the piston gable by means of a stay device.

To supply air to the fluidizing device in the piston gable at a certain positive pressure and, as the pulverized material in the container becomes fluidized, to press the piston gable against it, there is provided between the piston gable and the main gable of the container a compressed air chamber, to which compressed air is supplied from outside, preferably through the guide tube. For this purpose air inlets, for example in the form of air holes, can be arranged in the vicinity of the connection of the guide tube to the main gable of the container; and the sliding tube for the piston gable, the which tube is prolonged in the direction towards the main gable of the container, may also be perforated.

To ensure that the fluidizing device is always at the lowest part of the piston gable adjacent to the bottom part of the cylinder, it is advisable to arrange the guide tube eccentrically in the cylindrical container.

The sealing of the piston gable to the wall of the container may suitably be done with a lip seal, which may be supported by an, in profile, essentially U-shaped ring. By exposing the lip seal to pressure from the compression chamber by means of a compressed air connection, a satisfactory abutment of the seal to the wall of the container can be obtained notwithstanding any variations in cross-section of the container.

The outlet for the container with associated fluidizing device may suitably by arranged in the end gable of the container.

If so desired, two containers, essentially in one another's extension, with at least one common guide tube, can be combined in such a way that the end gables are directed outwards, whereas the main gables are removed and the walls of the containers are thus welded together. In this way there is formed between the piston gables of the two containers a common compressed air mid-section to which air can be supplied through the common guide tube. It is possible in this way to double the volume of the container without need to increase the length of the body of pulverized material which is to be fluidized from each piston gable.

For stationary containers this principle can be taken further and a number of containers can be arranged in star formation, constituting a multiple of two containers, essentially in one another's extension and with end gables remote from one another and with main gables removed.

This invention will now be described with reference to FIGS. 2–5 in the attached drawings, where FIG. 1 shows the storage container in the form of a trailer.

Figure 2:
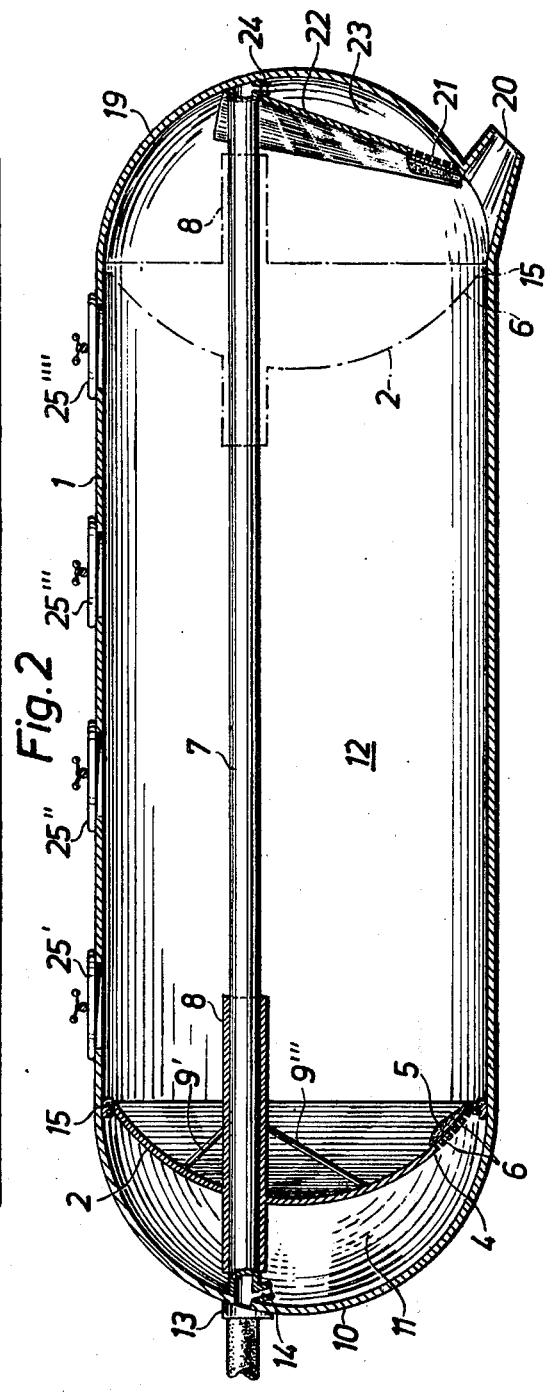

FIG. 2 shows a container according to one embodiment of the invention with one piston gable, FIG. 3 shows a detail of the ring-shaped lip seal between the periphery of the piston gable and the wall of the container, FIG. 4 shows a cross-section of FIG. 2, viewed in the direction towards the piston gable and FIG. 5 shows another embodiment of the invention in which two containers of the type shown in FIG. 2 are welded together, after removal of the main gables, with the end gables remote from one another and with the two piston gables facing one another, so forming a compression chamber between them.

In FIGS. 2, 4 and 5 no vehicle parts have been shown, but it is obvious that the containers shown can be used either as stationary storage containers, such as silos, or as containers placed on one or more pairs of wheels or bogies, either so as to obtain a trailer roughly of the type shown in FIG. 1 or a trailer with pairs of wheels or bogies at both ends of the container.

As regards general information concerning transport and handling of bulk material of pulverized character, we refer to an elucidatory article in the journal "Plast Forum," no. 6, 1970. This article contains information concerning loading and discharging, and fluidization in conjunction with discharging, and also concerning suitable discharge pressures for the fluidizing air which is blown into the material through a fluidizing device, for example in the form of a cloth tightly stretched over the air supply aperture. It also contains information concerning container volumes, weights, and loading capacity of suitable vehicles.

The characteristic feature of the invention is, as already stated, the use of a piston gable movable in the cylindrical container, the piston gable having at the bottom a fluidizing device and thus being able to move the fluidized bulk material along to a discharge device in the discharge end of the cylinder, which may suitably be provided with a fluidizing device.

As appears from FIG. 2, the embodiment of the invention shown in suited to a container for pulverized or granular material. The container has a cylindrical portion 1, a main gable 10 and an end gable 19. Near the main gable 10 is shown a piston gable 2 which is designed to move like a piston in the longitudinal direction of the cylinder 1. The piston gable is guided by a guide tube 7 running parallel to the longitudinal axis of the cylinder 1. The piston gable 2 is attached to a sliding tube 8 by means of struts 9'-9'''' and, by means of this sliding tube, can be moved along the guide tube 7. The piston, like the cylinder 1, is made of aluminum, steel or stainless steel plate, and the sliding tube 8 passes through the surface of the piston 2 and extends as far as the main gable 10 of the container in such a way that an air chamber 11 is formed between the piston gable 2 and the main gable 10. In its lower portion the piston gable 2, in its portion 4 movable along the bottom part 3 of the cylinder, is furnished with a powder-fluidizing device formed by furnishing the said portion 4 of the piston gable with perforations 6 which are covered either by a cloth 5 or by a rubber sheet, attached to one and free at the other of its edges, which is pressed by the pulverized material against the perforations 6.

The guide tube 7 is preferably placed somewhat above the centre-line of the container 1 so that the piston 2, during its movement, shall not be twisted but retain its portion 4 with the fluidizing device 5, 6 at the bottom in contact with the bottom part 3 of the cylinder. The guide tube 7 has an air supply port 13 and discharges part of its air into the air chamber 11 through air outlets 14 or perforations in its wall. If the sliding tube 8 extends as far as the main gable 10, the part of said tube which covers the air perforations in the tube 7 must also be perforated. The air supply may have a pressure of, for example, 1–2 atmospheres gauge and the air resistance in the fluidizing device 5, 6 should be such as to produce a pressure of about 1.4 atmosphere gauge in the air chamber 11. Round the periphery of the piston gable 2 is a lip seal 17 which is secured by an, in profile, essentially U-shaped ring 16 attached to a peripheral edge of the piston gable, the inside of this U-shaped ring communicates through apertures 18 with the air chamber 11, whereby the lip seal 17 as well is placed under pressure and is pressed against the inner wall of the cylindrical container 1, so ensuring a seal notwithstanding minor deviations in the diameter of the cylinder. A detail of the seal in section is shown in FIG. 3.

Instead of one guide tube 7 there may, if desired, be two or more guide tubes, preferably arranged symmetrically around the centre axis of the cylinder 1.

The inside of the piston gable is shown in a cross-section of the container in FIG. 4. As appears from FIG. 2, the piston gable 2 can in this way, under the action of the positive pressure in the air chamber 11, be moved towards the end gable 19, finally attaining the position shown by dot and dashed lines in FIG. 2.

On the end gable 19 a fluidization device 21 may also appropriately be arranged beside the discharge outlet 20. It is appropriate to arrange this fluidization device in connection with a guiding or feeding plate 22, which can be welded between the outlet 20 and the attachment of the guide tube 7 in the end gable 19. In this way there is formed between the guiding or feeding plate 22 and the end gable 19 an air chamber 23 which is supplied with air through a nozzle 24 from the guide tube 7.

The container according to the invention is used as follows. First the container is filled through the manholes 25'-25''''. The material, which may be any fluidizable bulk material whatsoever, e.g., powdered cement, sand, lime, chalk, sugar, fodder, flour, plastic in powder or pellet form, PVC, seed, salt etc. then fills the entire material space 12, the piston gable 2 then being in the position shown in FIG. 2 and the outlet 20 being closed. The container is considered to be at atmospheric pressure and in this state the material can be transported by road, if the container is provided with bogies, or by rail if placed on a railroad truck. On arrival at the discharge site, where there should appropriately be a stationary silo, a discharge pipeline of aluminum or stainless steel is connected to the outlet 20. Before opening of an outlet valve, not shown in the drawing, in the outlet 20, compressed air is introduced through the inlet 14 into the guide tube 7 and, through the latter, at least to the air chamber 11 at the main gable, but preferably also to the air chamber 23 at the end gable. As soon as a sufficient positive pressure has been formed in the air chambers 11, 23, fluidization air will flow in through the fluidizing devices 5, 6 and 21. The air, first in the form of bubbles, will flow up through the pulverized or granular material along the piston gable 2 and along the guiding or feeding plate 22 and the end gable 19. As soon as the valve in the outlet 20 is opened, the fluidized material above the outlet 20 will, owing to the air stream through the fluidizing device, flow down through the outlet, out through the connected discharge pipeline and into the stationary silo not shown in the drawing.

As a result thereof the material in the upper part of the container 1, fluidized by the fluidizing device 6, 5, will flow along the upper cylindrical part of the container, out towards the end gable 19 and out through the outlet 20. The material thus flows from the area above the fluidizing device 5, 6 and the flow path that is opened along the upper part of the cylinder, and out to the outlet 20. At the same time, owing to the positive pressure in the chamber 11, the piston gable 2 will be forced towards the end gable 19, so that the material in chamber 12 will gradually be fluidized by the fluidizing device 5, 6 and discharged in the mannr already described until the piston gable 2 has reached the dot and dashed-line position shown in FIG. 2, when all material has been discharged, without need to tilt the cylinder 1.

Obviously, for especially difficultly handled material, it would be conceivable slightly to tilt the container 1 during discharge or to have the container mounted slightly obliquely on the bogies.

It is also obvious that, if required, the aforementioned method of discharge could be combined with exposure of the material to sound waves by means of a sound activating device.

Another embodiment of the invention is shown in FIG. 5. Here two containers are arranged in one another's extension with the end gables remote from one another and the main gables removed. Thus one welds together the two main ends of two containers of the type shown in FIG. 2, from which the main gables 10 have been removed. The two end gables 19I and 19II are joined together by a common guide tube 7I, II and there are two piston gables 2I and 2II with their gable sides facing one another. The piston gables are made to slide by means of sliding tubes 8I and 8II sliding on the part of the common guide tube 7I, II corresponding to the material chambers 12I and 12II. In this way an air chamber 11I, II is obtained between the two piston gables. The two containers are designated I and II and in this way two chambers 12I and 12II are obtained, each serving in the same way as the chamber 12 in FIG. 2 and each being filled through their respective manholes and emptied through their outlets 20I, 20II in the end gables 19I, 19II, possibly with the aid of fluidizing devices 21I, 21II.

A combined container of this kind can also be placed on bogies and thus made transportable. But it can also be made stationary, and in the stationary embodiment four containers can be arranged in cross formation or an even larger number of containers in star formation. In this way one obtains a multiple of two containers placed in one another's extension with end gables remote from one another and with main gables removed, all containers having a common compressed air chamber in the centre, formed by a number of piston gables, and each container having an outlet in its end gable. Other combinations are also conceivable. For example there may be a number of parallel containers with a common compressed air chamber and a common main gable, the which containers may either be emptied all at one time or each separately.

Although the invention has been described with reference to two of its embodiment, it can nevertheless be arbitrarily varied within the scope of the following claims.

What I claim is:

1. Transport or storage container for fluent or fluidizable solids comprising a cylindrical container, the opposing ends thereof being of bell-shaped configuration, thus forming a first and a second end chamber area, a guide tube positioned within the cylinder parallel to the longitudinal axes thereof, a bell-shaped generally rigid piston movably mounted around said guide tube and sealingly engaging the interior of the cylindrical container, said piston having fluidizing means located in a lower section thereof, pressure inducing means located in the vicinity of and opening into the said first end chamber area, fluidizing means located in the second end chamber area adjacent a discharge outlet, and means for filling the cylinder with solids.

2. Container according to claim 1, wherein said guide is positioned parallel to but above the longitudinal axis of said cylinder.

3. Container according to claim 1, wherein said piston is movably mounted around said guide tube by means of a slidable tube surrounding said guide tube and being fixedly attached to said piston by a plurality of struts.

4. Container according to claim 1, wherein movement of the piston along the guide tube toward the discharge outlet is restricted to an area immediately preceeding the second end chamber area.

5. Container according to claim 1, wherein said fluidizing means located in a lower section of said piston comprises a perforated section, the interior side thereof being masked to prevent solids from entering said perforated section.

6. Container according to claim 1, wherein said piston sealingly engages the interior of the cylindrical container by means of U-shaped ring, the closed section thereof being fixedly attached to the periphery of said piston, the open section thereof supporting a flexible lip seal abutting the interior of said cylindrical container.

7. Container according to claim 6, wherein said U-shaped ring is provided with an aperture for the introduction of pressure to produce a tight seal between the flexible lip seal and the interior of said cylindrical container.

8. Container according to claim 1, wherein said pressure inducing means comprises an air supply port extending to the exterior of the container and connectable to a source of compressed air, said supply port also communicating with the guide tube, said guide tube containing air outlets to permit at least part of the compressed air to enter said first chamber area.

9. Container according to claim 8, wherein said guide tube further contains an additional air nozzle communicating with the fluidizing means located in said second end chamber area.

10. Container according to claim 1, wherein said fluidizing means located in said second end chamber area comprises a guiding plate fixedly attached and extending between the discharge outlet and the end section of the guide tube, an air nozzle extending from the end section of the guide tube, said guiding plate having a plurality of perforations in its lower section, therein permitting passage of air therethrough.

11. Transport or storage container for fluent or fluidizable solids comprising a plurality of cylindrical containers spatially adjoined to form a central air chamber common to all of said cylindrical containers, each of said containers having an end section of bell-shaped configuration opposed to said central air chamber and forming an end chamber area, a guide tube positioned within each container parallel to the longitudinal axis thereof, a bell-shaped generally rigid piston movably mounted around said guide tube and sealingly engaging the interior of the container, said piston having fluidizing means located in a lower section thereof, a second fluidizing means located in said end chamber area adjacent a discharge outlet, means for filling the cylinder and pressure inducing means located in the vicinity of and opening into said central air chamber.

* * * * *